US012427910B2

(12) United States Patent
Makii

(10) Patent No.: US 12,427,910 B2
(45) Date of Patent: Sep. 30, 2025

(54) VEHICLE HEADLAMP DEVICE

(71) Applicant: SUBARU CORPORATION, Tokyo (JP)

(72) Inventor: Ryosuke Makii, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 282 days.

(21) Appl. No.: 18/222,190

(22) Filed: Jul. 14, 2023

(65) Prior Publication Data

US 2024/0051454 A1 Feb. 15, 2024

(30) Foreign Application Priority Data

Aug. 9, 2022 (JP) ................................. 2022-127048

(51) Int. Cl.
*B60Q 1/08* (2006.01)
*B60Q 1/14* (2006.01)

(52) U.S. Cl.
CPC ............. *B60Q 1/085* (2013.01); *B60Q 1/143* (2013.01); *B60Q 2300/11* (2013.01); *B60Q 2300/33* (2013.01)

(58) Field of Classification Search
CPC .... B60Q 1/085; B60Q 1/143; B60Q 2300/11; B60Q 2300/33
USPC .......................................................... 701/49
See application file for complete search history.

(56) References Cited

U.S. PATENT DOCUMENTS

| | | | |
|---|---|---|---|
| 2006/0023461 A1* | 2/2006 | Knight | F21S 41/143 362/466 |
| 2016/0016507 A1* | 1/2016 | Cheng | B60Q 1/324 362/540 |
| 2017/0197540 A1* | 7/2017 | Hibino | B60Q 1/143 |
| 2021/0146823 A1* | 5/2021 | Pomish | B60Q 3/80 |
| 2021/0197708 A1* | 7/2021 | Sung | G06V 20/584 |

FOREIGN PATENT DOCUMENTS

| | | | |
|---|---|---|---|
| DE | 10313731 A1 * | 10/2004 | ............... B60Q 1/22 |
| JP | H08-142744 A | 6/1996 | |
| JP | 2015-227130 A | 12/2015 | |

* cited by examiner

Primary Examiner — Hunter B Lonsberry
Assistant Examiner — Helen Li
(74) Attorney, Agent, or Firm — MCGINN I.P. LAW GROUP, PLLC

(57) ABSTRACT

A vehicle headlamp device includes a headlamp unit, a light distribution direction changer, a traveling state changer, and an arithmetic controller. The headlamp unit is configured to illuminate an area ahead of a vehicle. The light distribution direction changer is configured to change a light distribution direction of the headlamp unit. The traveling state changer is configured to change a traveling state of the vehicle. The arithmetic controller is configured to, upon detecting a backward movement of the vehicle due to an operation received by the traveling state changer, cause the light distribution direction changer to change the light distribution direction of the headlamp unit more outward in a vehicle width direction of the vehicle than in a normal traveling state.

8 Claims, 5 Drawing Sheets

FIG. 1
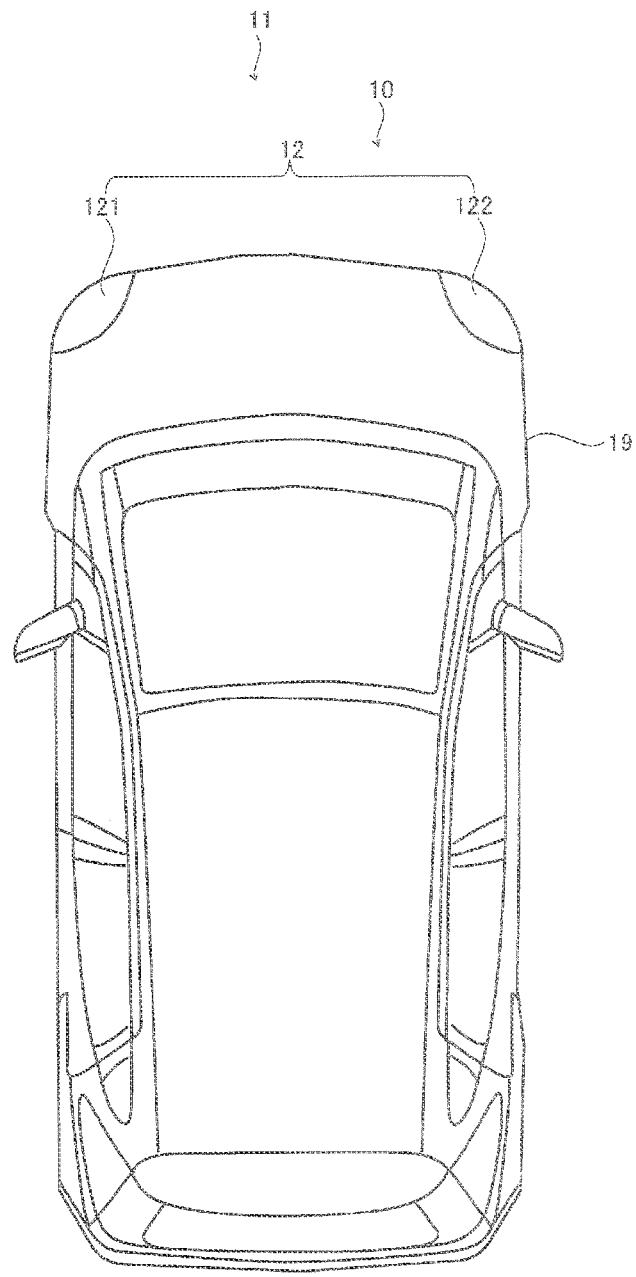
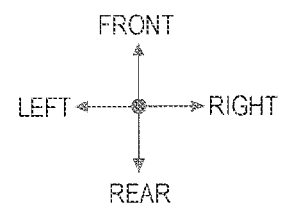

VEHICLE HEADLAMP DEVICE

CROSS-REFERENCE TO RELATED APPLICATIONS

The present application claims priority from Japanese Patent Application No. 2022-127048 filed on Aug. 9, 2022, the entire contents of which are hereby incorporated by reference.

BACKGROUND

The disclosure relates to a vehicle headlamp device that illuminates an area ahead of a vehicle.

In a typical vehicle, a headlamp is disposed at a front end of a vehicle body, and an area ahead of the vehicle is illuminated with the headlamp to secure visibility of an occupant during nighttime traveling or the like.

In recent years, a vehicle including a swivel mechanism that performs swivel control on a headlamp emerges. In one example, the swivel mechanism changes a swivel angle of the headlamp according to a steering angle or a road curvature of a road ahead included in road map data. In this manner, a range illuminated with the headlamp coincides with a viewing direction of a driver. Therefore, visibility of the driver when the vehicle travels through a corner is improved, and safety during nighttime traveling is improved.

As a technique related to the swivel control, Japanese Unexamined Patent Application Publication (JP-A) No. H08-142744 describes a mechanism that tilts, during a backward movement, a light distribution direction of a headlamp in an anti-steering direction and at a steering angle having a rate larger than that during a forward movement. In this manner, lateral sides of a vehicle body can be illuminated following a movement of an eye point of a driver.

Japanese Unexamined Patent Application Publication (JP-A) No. 2015-227130 describes a technique of dimming a headlamp when an object is detected by a front detection sensor.

SUMMARY

An aspect of the disclosure provides a vehicle headlamp device including a headlamp unit, a light distribution direction changer, a traveling state changer, and an arithmetic controller. The headlamp unit is configured to illuminate an area ahead of a vehicle. The light distribution direction changer is configured to change a light distribution direction of the headlamp unit. The traveling state changer is configured to change a traveling state of the vehicle. The arithmetic controller is configured to, upon detecting a backward movement of the vehicle due to an operation received by the traveling state changer, cause the light distribution direction changer to change the light distribution direction of the headlamp unit more outward in a vehicle width direction of the vehicle than in a normal traveling state.

An aspect of the disclosure provides a vehicle headlamp device including a headlamp unit, a light distribution direction changer, a traveling state changer, and circuitry. The headlamp unit includes a light source, and is configured to illuminate an area ahead of a vehicle. The light distribution direction changer includes an actuator and is configured to change a light distribution direction of the headlamp unit. The traveling state changer includes a shift lever or a shift switch and is configured to change a traveling state of the vehicle. The circuitry is configured to, when upon detecting a backward movement of the vehicle due to an operation received by the traveling state changer, cause the light distribution direction changer to change the light distribution direction of the headlamp unit more outward in a vehicle width direction of the vehicle than in a normal traveling state.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 1 is a top view illustrating a vehicle headlamp device and a vehicle according to an embodiment of the disclosure.

DETAILED DESCRIPTION

Figure 2:
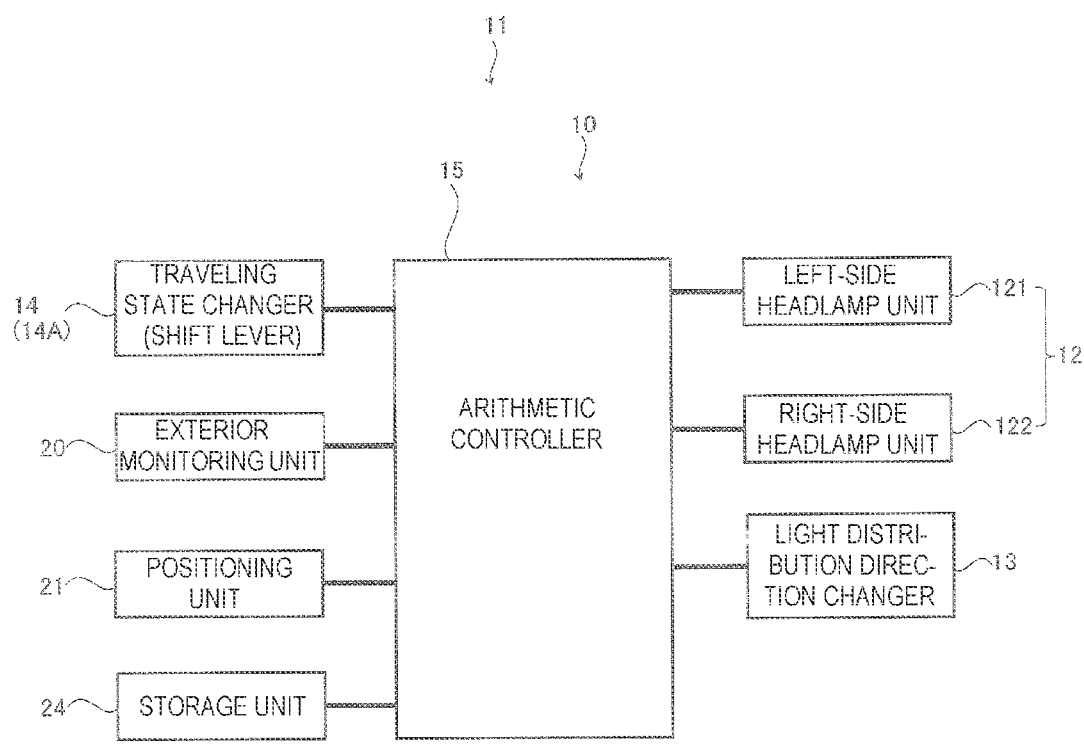
FIG. 2 is a block diagram illustrating the vehicle headlamp device and the vehicle according to the embodiment of the disclosure.

The techniques described in JP-A No. H08-142744 and JP-A No. 2015-227130 described above have room for improvement from a viewpoint of properly securing visibility of an occupant during a backward movement.

In one example, in the technique described in JP-A No. H08-142744, the light distribution direction of the headlamp is simply set to the anti-steering direction when a vehicle moves backward, and thus an effect of improving visibility of surroundings when the vehicle moves backward is limited. The technique described in JP-A No. 2015-227130 simply describes a technique of dimming light in a predetermined situation, and does not actively improve visibility of a driver at night.

It is desirable to provide a vehicle headlamp device that can properly secure visibility of an occupant during a backward movement.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Hereinafter, a vehicle headlamp device 10 and a vehicle 11 according to the embodiment of the disclosure will be described in detail based on the drawings. The following description uses a front-rear direction, an upper-lower direction, and a left-right direction, and the left-right direction is a left-right direction in which the vehicle 11 is viewed from a rear side. Further, in the following description, as a general rule, the same members are denoted by the same reference numerals, and repeated descriptions will be omitted.

FIG. 1 is a top view illustrating the vehicle headlamp device 10 and the vehicle 11.

The vehicle headlamp device 10 is provided at a front end side of a vehicle body 19 of the vehicle 11, such as a passenger vehicle, and is a device that controls light distribution of a headlamp unit 12.

The headlamp unit 12 is made of a halogen lamp, an LED, or the like, and illuminates an area ahead of the vehicle 11 during traveling. The headlamp unit 12 may include a light source. The headlamp unit 12 includes a left-side headlamp unit 121 and a right-side headlamp unit 122. The left-side headlamp unit 121 is disposed on a left side of the front end of the vehicle body 19 and illuminates a left area ahead of the vehicle 11. The right-side headlamp unit 122 is disposed on a right side of the front end of the vehicle body 19 and illuminates a right area ahead of the vehicle 11.

The vehicle headlamp device 10 includes a swivel mechanism. The swivel mechanism is a mechanism that causes a light distribution direction of the headlamp unit 12 to be a curve direction when the vehicle 11 travels on a curve. Such a mechanism will be described later with reference to FIG. 2 and the like.

FIG. 2 is a block diagram illustrating the vehicle headlamp device 10 and the vehicle 11.

The vehicle 11 mainly includes an arithmetic controller 15, a traveling state changer 14, an exterior monitoring unit 20, a positioning unit 21, a storage unit 24, the headlamp unit 12, and a light distribution direction changer 13. Among these components, the headlamp unit 12, the light distribution direction changer 13, and the arithmetic controller 15 mainly constitute the vehicle headlamp device 10.

The arithmetic controller 15 is, for example, a semiconductor element including a CPU, a RAM, a ROM, and the like. The traveling state changer 14, the exterior monitoring unit 20, the positioning unit 21, the storage unit 24, and the like are coupled to coupling-side terminals of the arithmetic controller 15. The headlamp unit 12, the light distribution direction changer 13, and the like are coupled to output-side terminals of the arithmetic controller 15.

A shift lever 14A as the traveling state changer 14 is a device operated by an occupant to switch a traveling state of the vehicle 11. The occupant operates the traveling state changer 14, so that the traveling state of the vehicle 11 can be switched to a stopped state, a backward moving state, or a forward moving state. Herein, the stopped state is referred to as a parking position, the backward moving state is referred to as a reverse position, and the forward moving state is referred to as a driving position. In addition, a shift switch can be adopted as the traveling state changer 14.

The exterior monitoring unit 20 is a device that monitors an exterior front side, an exterior lateral side, or an exterior rear side of the vehicle 11. For example, a stereo camera, a sonar, or a radar can be adopted as the exterior monitoring unit 20.

The positioning unit 21 is a device that accurately positions a position of the vehicle 11 using a global positioning system (GPS).

The storage unit 24 is, for example, a storage medium such as a semiconductor element including a RAM, a ROM, and the like. The storage unit 24 stores map data, for example. The map data includes position information that specifies a predetermined area where the vehicle 11 can be parked, such as a parking lot.

As described above, the headlamp unit 12 includes the left-side headlamp unit 121 and the right-side headlamp unit 122.

The light distribution direction changer 13 is a device that changes light distribution directions of the left-side headlamp unit 121 and the right-side headlamp unit 122. For example, the light distribution direction changer 13 is an actuator that changes the light distribution directions of the left-side headlamp unit 121 and the right-side headlamp unit 122 to the left-right direction by a mechanical operation.

The vehicle headlamp device 10 having such a configuration includes the swivel mechanism. The swivel mechanism is a mechanism that improves visibility of a driver by causing the light distribution direction changer 13 to flexibly change the light distribution direction of the headlamp unit 12 based on an instruction from the arithmetic controller 15 when the vehicle 11 travels on a curve.

For example, when the vehicle 11 travels on a right curve, the light distribution direction changer 13 changes the light distribution directions of the left-side headlamp unit 121 and the right-side headlamp unit 122 to a right side by a predetermined swivel angle based on an instruction from the arithmetic controller 15. In this manner, a road ahead of the right curve can be effectively illuminated with the left-side headlamp unit 121 and the right-side headlamp unit 122. Therefore, when the vehicle 11 travels on the right curve, visibility of an occupant can be improved and safety can be improved. The same also applies when the vehicle 11 travels on a left curve.

Figure 3:
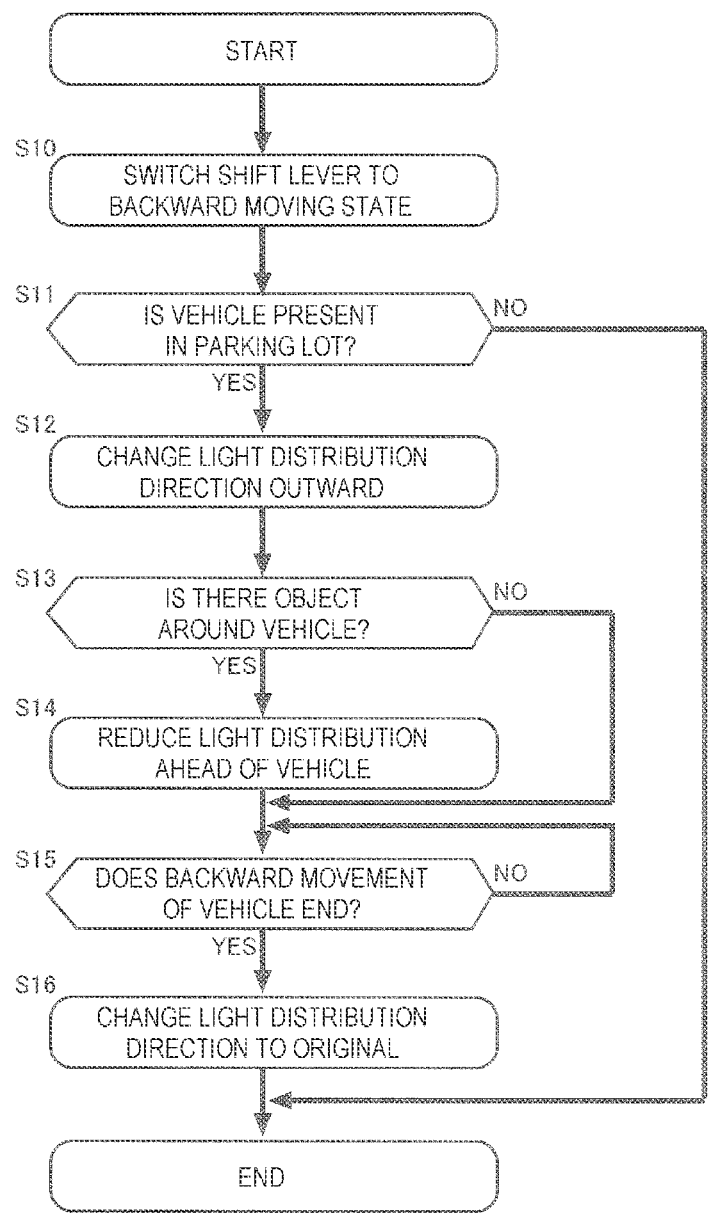
FIG. 3 is a flowchart illustrating operations of the vehicle headlamp device and the vehicle according to the embodiment of the disclosure.

FIG. 3 is a flowchart illustrating operations of the vehicle headlamp device 10 and the vehicle 11. Based on FIG. 3, a method of illuminating surroundings when the vehicle 11 moves backward will be described with reference to the above-described drawings.

In step S10, when the vehicle 11 is traveling, based on an operation of the occupant, the arithmetic controller 15 switches the shift lever 14A to the backward moving state.

Figure 4:
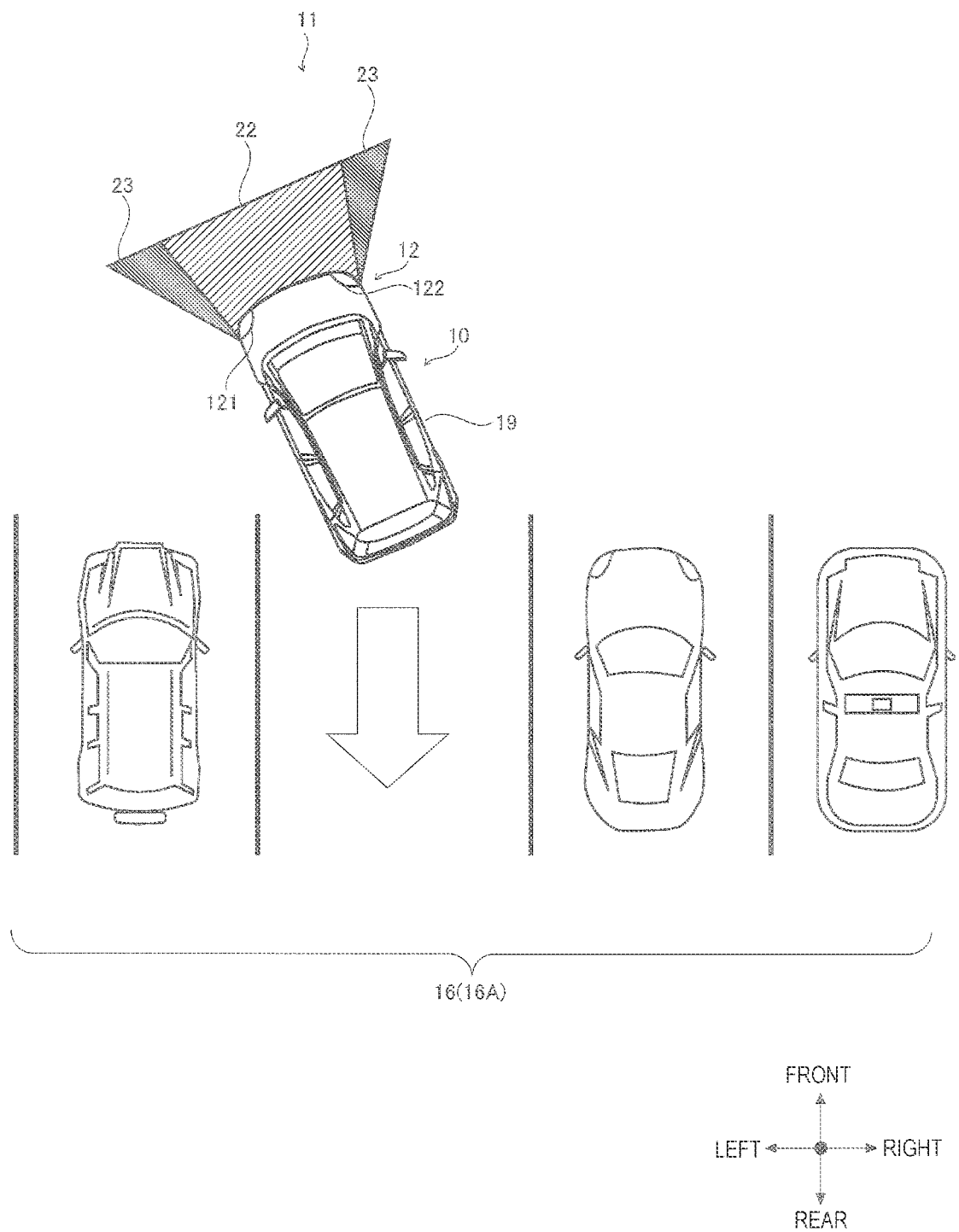
FIG. 4 is a view illustrating the vehicle headlamp device and the vehicle according to the embodiment of the disclosure, and is a top view illustrating a situation when the vehicle moves backward.

In step S11, when a backward movement of the vehicle 11 is detected by operating the traveling state changer 14, the arithmetic controller 15 determines whether the vehicle 11 is present in a predetermined area 16. Referring to FIG. 4, the predetermined area 16 is an area other than a public road, and is, for example, a parking lot 16A as an area where the vehicle 11 can be parked. Such a determination is made by positioning accurate position information of the vehicle 11 via the positioning unit 21 and comparing the position information with the map data stored in the storage unit 24.

When it is determined to be YES in step S11, that is, when the vehicle 11 during the backward movement is present in the parking lot 16A, the arithmetic controller 15 proceeds to step S12.

When it is determined to be NO in step S11, that is, when the vehicle 11 during the backward movement is not present in the parking lot 16A, the arithmetic controller 15 proceeds to END. That is, a swivel function is not operated in the backward movement.

In step S12, when the headlamp unit 12 is turned on, the arithmetic controller 15 uses the swivel mechanism to change the light distribution direction of the headlamp unit 12 outward in a vehicle width direction. That is, a light distribution width of the headlamp unit 12 is widened.

In one example, referring to FIG. 4, when the light distribution direction of the headlamp unit 12 is changed, the light distribution direction changer 13 changes the light distribution direction of the left-side headlamp unit 121 more leftward than in a normal traveling state based on an instruction from the arithmetic controller 15. At the same time, the light distribution direction changer 13 changes the light distribution direction of the right-side headlamp unit 122 more rightward than in the normal traveling state based on an instruction from the arithmetic controller 15. Herein, the normal traveling state refers to a state in which the vehicle 11 travels forward.

Herein, the light distribution direction in the normal traveling state is indicated by a normal illumination area 22, and the light distribution direction after the light distribution direction is widened by the light distribution direction changer 13 is indicated by backward moving illumination areas 23. Herein, the backward moving illumination areas 23, which are directly distributed with light by the headlamp unit 12, are indicated by hatched lines. Actually, light emitted from the headlamp unit 12 is reflected by the ground or the like, and is thus affected by the light distribution of the headlamp unit 12 to lateral sides of the vehicle 11.

In this manner, when the vehicle 11 moves backward, the light distribution direction of the headlamp unit 12 is enlarged outward in the vehicle width direction, so that brightness around the vehicle 11 can be secured, the visibility when the vehicle moves backward can be improved, and the safety can be improved. That is, the area illuminated by the left-side headlamp unit 121 is enlarged leftward, so that a left side of the vehicle 11 is effectively illuminated, and an object such as another vehicle or a person present in this area can be visually recognized properly. Similarly, the area illuminated by the right-side headlamp unit 122 is enlarged rightward, so that a right side of the vehicle 11 is effectively illuminated, and an object such as another vehicle or a person present in this area can be visually recognized properly. The rear side of the vehicle 11 is illuminated by a backup lamp (not illustrated herein). Therefore, since both lateral sides and the rear side of the vehicle 11 are properly illuminated, the occupant can move the vehicle 11 backward while visually recognizing a surrounding situation properly.

Figure 5:
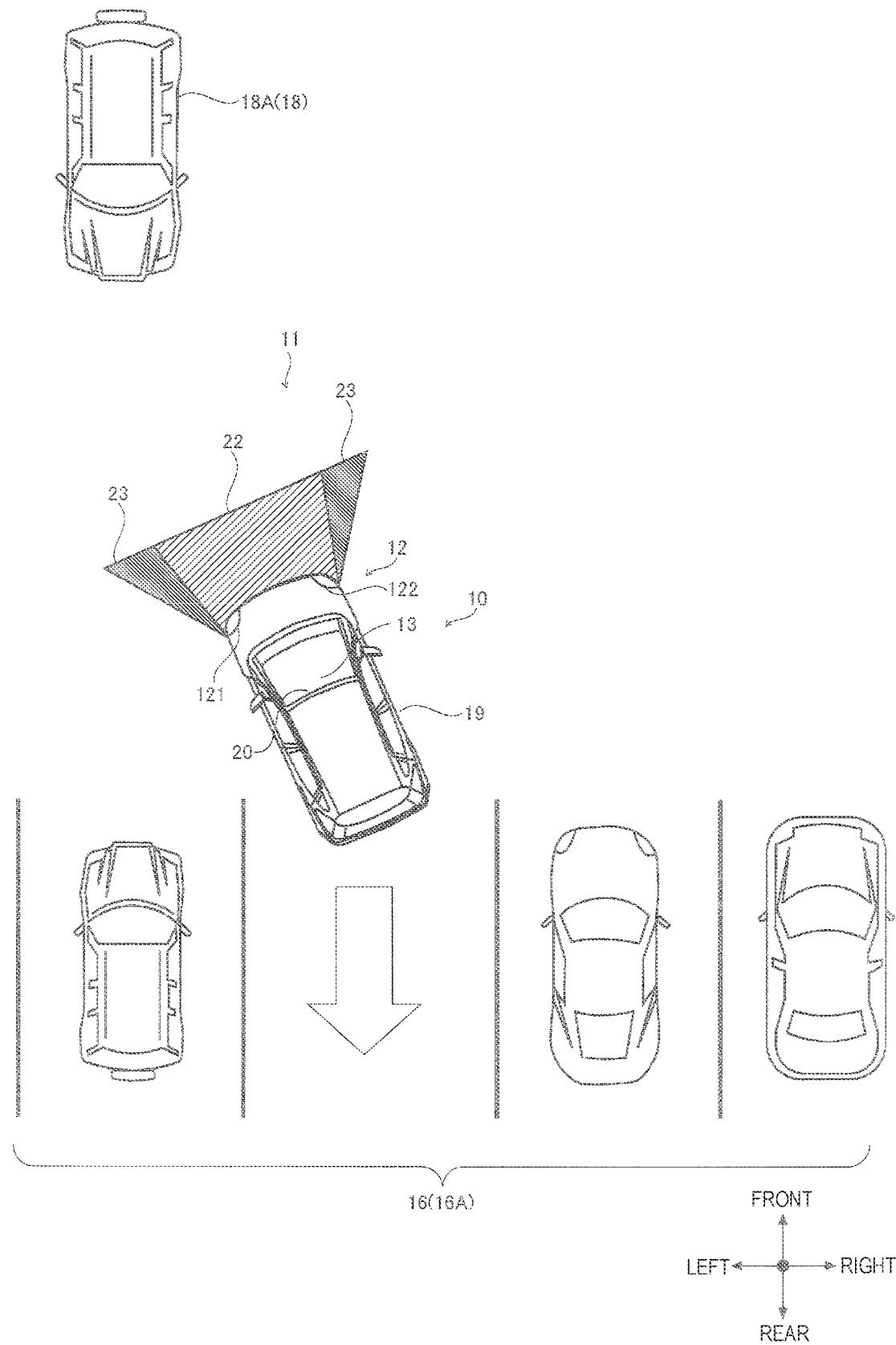
FIG. 5 is a view illustrating the vehicle headlamp device and the vehicle according to the embodiment of the disclosure, and is a top view illustrating a situation when the vehicle moves backward while another vehicle is present.

In step S13, the arithmetic controller 15 confirms whether another vehicle 18A as an object 18 is present around the vehicle 11, for example, in front of the vehicle 11. Herein, referring to FIG. 5, the object 18 other than the other vehicle 18A is also considered. That is, for example, a motorcycle, a bicycle, a person, an animal other than a person, and the like may also be considered as the object 18.

This confirmation is performed by monitoring, for example, the area ahead of the vehicle 11, by the exterior monitoring unit 20 based on an instruction from the arithmetic controller 15. For example, referring to FIG. 5, when the other vehicle 18A is present right in front of the vehicle 11, if the light distribution direction of the headlamp unit 12 is widened, it may be considered that an occupant on aboard the other vehicle 18A feels glare. In the present embodiment, the following anti-glare measures are taken to reduce the glare.

When it is determined to be YES in step S13, that is, when the other vehicle 18A is present around the vehicle 11, the arithmetic controller 15 proceeds to step S14.

When it is determined to be NO in step S13, that is, when the other vehicle 18A is not present around the vehicle 11, the arithmetic controller 15 proceeds to step S15.

In step S14, the arithmetic controller 15 reduces illumination from the headlamp unit 12 in a direction in which the object 18 is present.

As a mechanism that reduces the illumination from the headlamp unit 12, for example, a mechanism that reduces a swivel angle by the light distribution direction changer 13 in comparison with the case in step S12 can be adopted. In one example, referring to FIG. 5, the left-side headlamp unit 121 has a relatively small swivel angle leftward, and the right-side headlamp unit 122 has a relatively small swivel angle rightward. As an illumination mechanism that reduces the illumination from the headlamp unit 12, for example, a mechanism that moves an optical axis of the headlamp unit 12 downward can be adopted. Further, as an illumination reducing mechanism, a mechanism that blocks light above a horizontal line of a light distribution pattern of the headlamp unit 12 can be adopted. Further, when a multi-segment light source is adopted as the headlamp unit 12, a mechanism that turns off the light source above the horizontal line can be adopted as the illumination reducing mechanism.

In this manner, illumination from the headlamp unit 12 in a direction in which the other vehicle 18A is present is reduced, and thus the glare can be prevented for the occupant on aboard the other vehicle 18A.

In step S15, the arithmetic controller 15 determines whether the backward movement of the vehicle 11 ends. In one example, when a backward movement operation for parking the vehicle 11 ends, the occupant switches the shift lever 14A to, for example, a parking state. Therefore, based on an operation of the occupant, the arithmetic controller 15 determines whether the shift lever 14A is switched from the backward moving state to a state other than the backward moving state.

When it is determined to be YES in step S15, that is, when the backward movement of the vehicle 11 ends, the arithmetic controller 15 proceeds to step S16.

When it is determined to be NO in step S15, that is, when the backward movement of the vehicle 11 does not end, the arithmetic controller 15 continues the confirmation in step S15.

In step S16, the arithmetic controller 15 changes the light distribution direction to an original direction. In one example, referring to FIG. 4, the light distribution direction changer 13 changes a light distribution area of the headlamp unit 12 inward in the vehicle width direction based on an instruction from the arithmetic controller 15. That is, the light distribution direction of the left-side headlamp unit 121 is narrowed rightward, and the light distribution direction of the right-side headlamp unit 122 is narrowed leftward. In this manner, the light distribution area becomes the normal illumination area 22 from the backward moving illumination area 23.

The above description relates to the method of illuminating the surroundings when the vehicle 11 moves backward.

Hereinafter, technical ideas that can be grasped from the above-described embodiment will be described with effects thereof.

A vehicle headlamp device according to the disclosure includes: a headlamp unit configured to illuminate an area ahead of a vehicle; a light distribution direction changer configured to change a light distribution direction of the headlamp unit; a traveling state changer configured to change a traveling state of the vehicle; and an arithmetic controller. When the arithmetic controller detects a backward movement of the vehicle by operating the traveling state changer, the arithmetic controller changes the light distribution direction of the headlamp unit more outward in a vehicle width direction than in a normal traveling state, by the light distribution direction changer. According to the vehicle headlamp device of the disclosure, when the vehicle moves backward, the light distribution direction of the headlamp unit is changed outward in the vehicle width direction, so that brightness around the vehicle can be secured, and visibility when the vehicle moves backward can be improved, thereby improving safety.

In the vehicle headlamp device according to the disclosure, when the vehicle is present in a predetermined area, the arithmetic controller changes the light distribution direction of the headlamp unit more outward in the vehicle width direction than in the normal traveling state. According to the vehicle headlamp device of the disclosure, when the vehicle is present in the predetermined area, the light distribution direction of the headlamp unit is changed, so that the light distribution direction of the headlamp unit can be prevented from being unnecessarily changed.

In the vehicle headlamp device according to the disclosure, the predetermined area is an area where the vehicle is parked. According to the vehicle headlamp device of the disclosure, in a parking lot or the like where the vehicle is parked, surroundings of the vehicle are illuminated when the vehicle moves backward, and the safety when the vehicle moves backward can be improved.

In the vehicle headlamp device according to the disclosure, when a predetermined object is present around the vehicle, the arithmetic controller reduces illumination from the headlamp unit in a direction in which the object is present. According to the vehicle headlamp device of the disclosure, by reducing the illumination in the direction in which an object, for example, a person is present, glare can be prevented for the person.

In the vehicle headlamp device according to the disclosure, the headlamp unit includes a left-side headlamp unit and a right-side headlamp unit. When the light distribution direction of the headlamp unit is changed, the light distribution direction changer changes the light distribution direction of the left-side headlamp unit more leftward than in the normal traveling state, and changes the light distribution direction of the right-side headlamp unit more rightward than in the normal traveling state. According to the vehicle headlamp device of the disclosure, the visibility when the vehicle moves backward can be improved on a right side in the vehicle width direction and a left side in the vehicle width direction.

Although the embodiment of the disclosure is described above, the disclosure is not limited thereto and may be modified without departing from the subject matter of the disclosure. The modes described above can be combined with each other.

For example, referring to FIG. 4, a swivel angle at which a light distribution area of the headlamp unit 12 is enlarged to both sides in the vehicle width direction when the vehicle 11 moves backward can be made larger than a swivel angle when the vehicle travels on a curve in the normal traveling state. In this manner, the backward moving illumination area 23 can be enlarged in the vehicle width direction, and the visibility around the vehicle 11 when the vehicle moves backward can be further improved.

Further, referring to FIG. 2, a mechanism other than the actuator, for example, an electronic mechanism or an optical mechanism can be adopted as the light distribution direction changer 13.

The invention claimed is:

1. A vehicle headlamp device comprising:
   a headlamp unit configured to illuminate an area ahead of a vehicle;
   a light distribution direction changer configured to change a light distribution direction of the headlamp unit;
   a traveling state changer configured to change a traveling state of the vehicle; and
   an arithmetic controller configured to, upon detecting a backward movement of the vehicle due to an operation received by the traveling state changer, cause the light distribution direction changer to change the light distribution direction of the headlamp unit more outward in a vehicle width direction of the vehicle than in a normal traveling state.

2. The vehicle headlamp device according to claim 1, wherein the arithmetic controller is configured to, when the vehicle is in a predetermined area, change the light distribution direction of the headlamp unit more outward in the vehicle width direction than in the normal traveling state.

3. The vehicle headlamp device according to claim 2, wherein the predetermined area is an area where the vehicle can be parked.

4. The vehicle headlamp device according to claim 1, wherein the arithmetic controller is configured to, when a predetermined object is present around the vehicle, reduce illumination from the headlamp unit in a direction in which the object is present.

5. The vehicle headlamp device according to claim 2, wherein the arithmetic controller is configured to, when a predetermined object is present around the vehicle, reduce illumination from the headlamp unit in a direction in which the object is present.

6. The vehicle headlamp device according to claim 1, wherein
   the headlamp unit comprises a left-side headlamp unit and a right-side headlamp unit, and
   the light distribution direction changer is configured to, when the light distribution direction of the headlamp unit is changed, change a light distribution direction of the left-side headlamp unit more leftward than in the normal traveling state, and change a light distribution direction of the right-side headlamp unit more rightward than in the normal traveling state.

7. The vehicle headlamp device according to claim 2, wherein
   the headlamp unit comprises a left-side headlamp unit and a right-side headlamp unit, and
   the light distribution direction changer is configured to, when the light distribution direction of the headlamp unit is changed, change a light distribution direction of the left-side headlamp unit more leftward than in the normal traveling state, and change a light distribution direction of the right-side headlamp unit more rightward than in the normal traveling state.

8. A vehicle headlamp device comprising:
   a headlamp unit comprising a light source, the headlamp unit being configured to illuminate an area ahead of a vehicle;
   a light distribution direction changer comprising an actuator, the light distribution direction changer being configured to change a light distribution direction of the headlamp unit;
   a traveling state changer comprising a shift lever or a shift switch, the traveling state changer being configured to change a traveling state of the vehicle; and circuitry configured to, upon detecting a backward movement of the vehicle due to an operation received by the traveling state changer, cause the light distribution direction changer to change the light distribution direction of the headlamp unit more outward in a vehicle width direction of the vehicle than in a normal traveling state.

\* \* \* \* \*